US011895427B2

(12) United States Patent
Condorovici et al.

(10) Patent No.: US 11,895,427 B2
(45) Date of Patent: Feb. 6, 2024

(54) METHOD FOR GENERATING A COMPOSITE IMAGE

(71) Applicant: FotoNation Limited, Galway (IE)

(72) Inventors: Razvan Condorovici, Bucharest (RO); Andra Stan, Bucharest (RO); Cosmin Stan, Bucharest (RO)

(73) Assignee: FotoNation Limited

( * ) Notice: Subject to any disclaimer, the term of this patent is extended or adjusted under 35 U.S.C. 154(b) by 0 days.

(21) Appl. No.: 17/411,887

(22) Filed: Aug. 25, 2021

(65) Prior Publication Data

US 2023/0066958 A1    Mar. 2, 2023

(51) Int. Cl.
*H04N 5/272* (2006.01)
*G06T 7/194* (2017.01)
*H04N 23/88* (2023.01)

(52) U.S. Cl.
CPC .......... *H04N 5/272* (2013.01); *G06T 7/194* (2017.01); *H04N 23/88* (2023.01); *G06T 2207/30201* (2013.01)

(58) Field of Classification Search
CPC ............. H04N 1/6077; H04N 1/6086; H04N 23/70–741; H04N 23/88; G06T 7/10–194
USPC ...................................................... 348/223.1
See application file for complete search history.

(56) References Cited

U.S. PATENT DOCUMENTS

| 2003/0218677 | A1* | 11/2003 | Nishimura | ............. | H04N 9/735 |
| | | | | | 348/223.1 |
| 2016/0057363 | A1* | 2/2016 | Posa | .................... | H04N 1/2125 |
| | | | | | 348/239 |
| 2018/0315166 | A1* | 11/2018 | Noyes | .................... | H04N 9/735 |
| 2020/0213533 | A1* | 7/2020 | Zhang | .................... | G06V 20/64 |
| 2022/0070389 | A1* | 3/2022 | Tangeland | ............. | H04N 5/272 |
| 2022/0329769 | A1* | 10/2022 | Hsu | ........................ | H04N 9/793 |

FOREIGN PATENT DOCUMENTS

WO    WO-2017143392 A1 *    8/2017    ......... G06K 9/00234

* cited by examiner

*Primary Examiner* — Anthony J Daniels
(74) *Attorney, Agent, or Firm* — Lerner David LLP

(57) ABSTRACT

A method for generating a composite image comprises: detecting a color temperature of a background image; acquiring from a camera through an image signal processor, ISP, performing white balance correction of acquired image data, an image including a foreground region including face of a user; and detecting a color temperature of the foreground region. Responsive to the color temperature for the foreground region differing from that of the background image by more than a threshold amount, a color temperature for white balance correction of a subsequently acquired image is set which causes skin pixels within the foreground region of the subsequently acquired image to have a color temperature closer to the color temperature for the background image. Pixel values of the foreground region are combined with pixel values of the background image corresponding to a background region of the acquired image to provide the composite image.

18 Claims, 4 Drawing Sheets

METHOD FOR GENERATING A COMPOSITE IMAGE

FIELD

The present invention relates to a method for generating a composite image, in particular an image including a face of a user to be provided to other users in a video conference call.

BACKGROUND

For a variety of reasons including privacy, branding and appropriateness, many video conferencing systems allow a user to select a background image which appears as a background of their conference feed for a conference call rather than a background region from the video stream acquired from the user's video camera. As will be appreciated, the video camera can comprise a web cam or camera integrated within a laptop, tablet or smart phone or the video camera can comprise a camera separate from a computing device executing a conferencing system client application.

Typically, the conferencing system client application identifies a foreground region of any image acquired from the user's video camera and including the user's face and possibly upper body and then superimposes or replaces the corresponding pixels of the selected background image on the pixels of the background region of the acquired image before transmitting the composite image for display to other conference participants, as well as possibly displaying the composite image on the computing device executing the conferencing system client application.

The selected background image for any given image acquired from the user's video camera can comprise either: a static image; an image frame from a fragment of stored video; or indeed it is possible for the background to itself comprise an image frame from a live stream acquired from a source other than the user's video camera. Any static image can comprise an image of a natural scene or it may be an artificially generated image. In the case of a static image or a fragment of stored video, these can be stored in volatile or non-volatile memory accessible to the conference application. If the fragment of stored video is of shorter duration than the conference call, then typically the conferencing system client application will loop around the fragment of stored video as it selects individual image frames which are to act as the background for a given image of the video stream acquired from the user's video camera.

In many cases, however, the composite image frames comprising the conference feed produced by the conferencing system client application are obviously artificial, often due to dissimilarities in the lighting conditions involved in acquiring the video stream from the user's video camera and those of the background image.

It is an object of the present application to improve the quality of these composite image frames.

SUMMARY

According to the present invention, there is provided a method for generating a composite image according to claim 1

Methods according to the invention can both control acquisition and processing of raw images comprising a video stream from a user's video camera and post process acquired images to bring their characteristics closer to those of a selected virtual background.

In a further aspect there is provided a conferencing system client application which when executed on a computing device operably connected to a video camera is configured to perform the steps of the invention.

In a still further aspect, there is provided a computer program product comprising a computer readable medium on which instructions are stored which when executed on a computing device operably connected to a video camera are configured to perform the steps of the invention.

BRIEF DESCRIPTION OF THE DRAWINGS

Embodiments of the invention will now be described, by way of example, with reference to the accompanying drawings, in which.

DESCRIPTION OF THE EMBODIMENT

Figure 1:
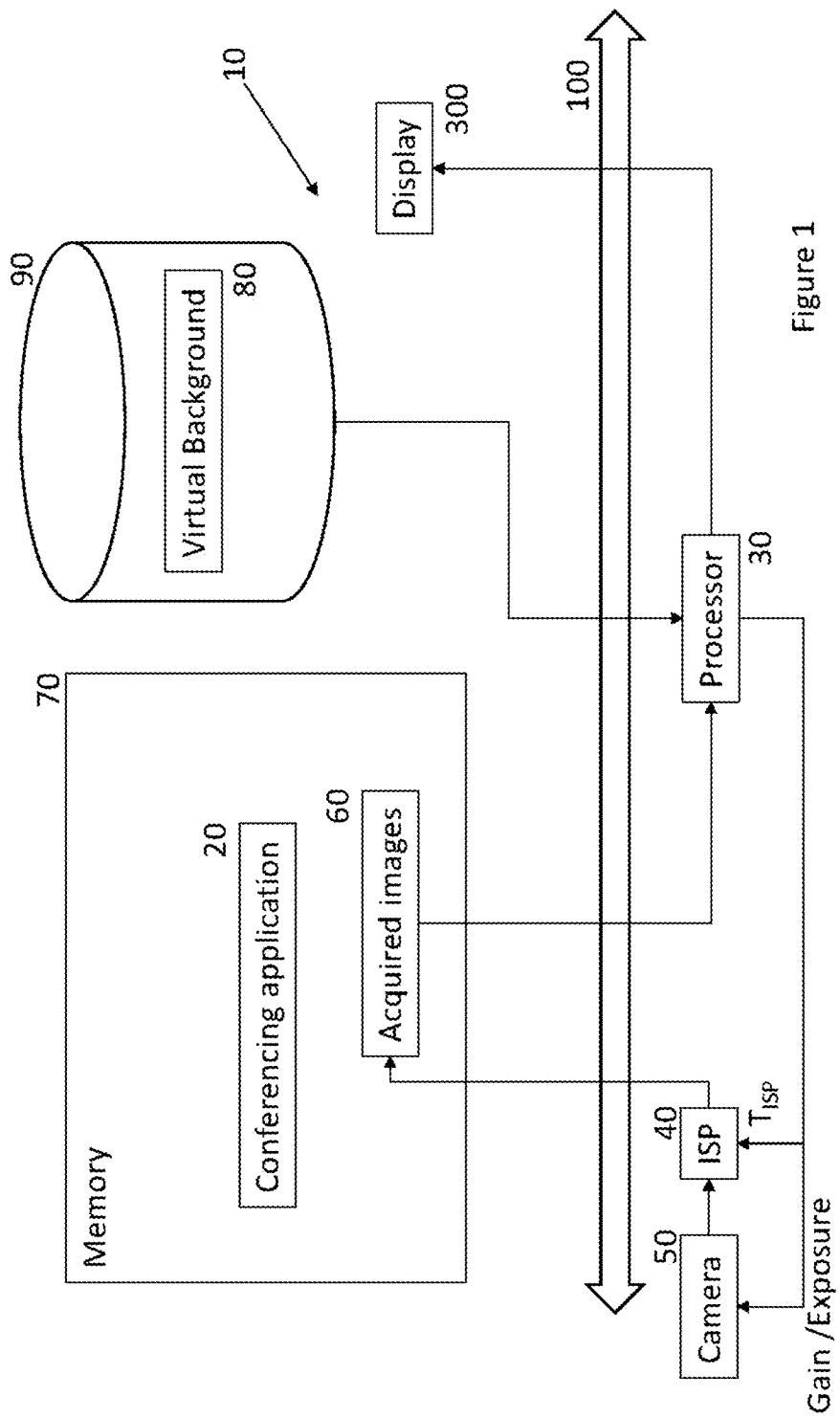
FIG. 1 shows an overview of a system including a conferencing system client application according to an embodiment of the present invention.

Referring now to FIG. 1, there is shown a system 10 including a conferencing system client application 20 according to an embodiment of the present invention. The conferencing application 20 executes in a system where a processor 30 has controlling access to an Image Signal Processor (ISP) 40 and video camera 50. This access can be provided across a system bus 100 or the access can be direct (as indicated) or across a network through a remote signaling protocol.

In any case, in the embodiment, the camera 50 and ISP 40 allow an application, such as the application 20, being executed by the processor 30 to set image acquisition parameters including camera gain and exposure time and a color temperature, which when asserted, can be used in a semi-automatic white balancing process, rather than automatic white balancing (AWB) often employed within an ISP.

In the case of AWB, a camera acquires an image of a scene ideally including a region comprising a substantial proportion of gray or white pixels. On receipt of the raw image data, the ISP 40 identifies this region and determines an illumination temperature for the scene. The table below illustrates typical light sources for a range of temperatures:

Color Temperature Light Source
1000-2000 K Candlelight
2500-3500 K Tungsten Bulb (household variety)
3000-4000 K Sunrise/Sunset (clear sky)
4000-5000 K Fluorescent Lamps
5000-5500 K Electronic Flash
5000-6500 K Daylight with Clear Sky (sun overhead)
6500-8000 K Moderately Overcast Sky
9000-10000 K Shade or Heavily Overcast Sky Typically, lower temperature sources are considered red, whereas higher temperature sources are considered blue and so in the description below increasing the color temperature of an image is referred to as making it bluer and vice versa for red.

Once the illumination temperature is determined, the ISP will determine a transformation of raw or semi-processed RGB values for an acquired image to transform the color temperature of the acquired image data to a target temperature. By default, this target temperature is usually 6500 K, regarded as natural neutral illumination.

For example, if an ISP automatically detects the color temperature of the illuminant for an image of a scene to be 3000K (warm light), it can rebalance the color channels by amplifying the blue channel. This can generate a color balanced image, of color temperature 6500K.

In semi-automatic mode, the ISP receives a specified temperature $T_{ISP}$ to be used directly in transforming the RGB values of the acquired image to the target color temperature. For the purposes of the present application, we will assume that the target color temperature is again 6500K.

Similar to AWB, automatic exposure (AE) enables the ISP 40 to set camera gain and/or exposure time to achieve maximum contrast and minimum saturation within a given acquired image or for a specific region of an image. Again, these values can be over-ridden by an application running on the processor 30, especially when a default automatic approach is not appropriate.

It should also be noted that as well as spatial image information provided by the ISP when writing a processed acquired image 60 to memory 70, the ISP 40 typically provides meta-data indicating the image acquisition parameters, such as gain and exposure time, for the acquired image as well as details of, for example, the color temperature originally determined for the acquired image.

In any case, in embodiments of the present application, the conferencing application 20 allows a user to select a background 80 for use during a video conference session/call. For simplicity, in this case, the background 80 is assumed to be a single image stored in non-volatile memory 90 accessible to the processor 30, however, as mentioned in the description, the background for any given frame of video acquired from the camera 50 can be a frame from a video sequence whether stored in memory 90 or being live streamed from a source other than the camera 50.

Figure 2:
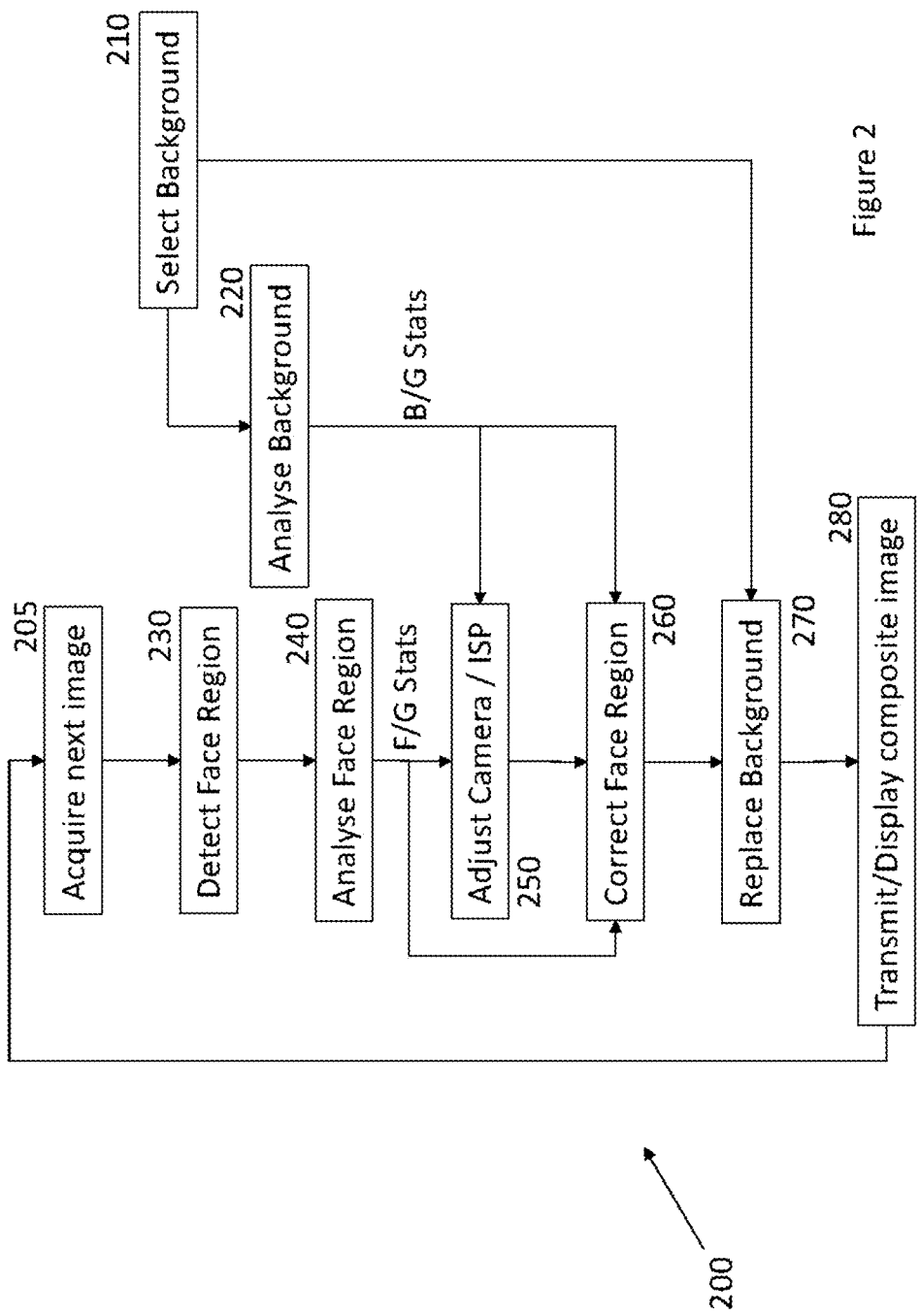
FIG. 2 is a flow diagram illustrating a method for generating a composite image according to an embodiment of the present invention performed by the conferencing system client application of claim 1.

Referring now to FIG. 2, there is shown a method 200 performed by the application 20 according to an embodiment of the invention. Once the user has selected the background image 80, step 210, its characteristics are analyzed, as described in more detail below, to determine statistics including temperature $T_{BKG}$ as well as, in some cases, an illumination value for the background image. These steps can be performed one or more times, either before or during a conference session/call.

During the course of the conference session/call, the camera 50 acquires successive images which are then processed by the ISP 40 and then written to memory 70 from which each image including its spatial and meta data can then be acquired by the application 20 running on the processor, step 205.

As in conventional systems, the application 20 identifies a foreground region including a user's face within the acquired image, step 230. In the embodiment, skin tones within this region are analyzed to determine a color temperature of the illumination source for the foreground region as well as determining illumination levels for the foreground region and the face region in particular, step 240. As such, even if a foreground region larger than a face is chosen to be displayed in a final composite image, it can still be beneficial to specifically identify a face region within the acquired image, for example, to avoid false positive identification of skin regions outside a face region and to concentrate on ensuring a well illuminated face in the final composite image.

Note that in many cases, the illumination source for the foreground region may differ from the background, for example, when the user's face is illuminated by their monitor, a blue source, whereas the background may be illuminated, by a redder light source.

In step 250, the foreground and background statistics produced at steps 220 and 240 are used to determine any adjustment which may be required to the camera and/or ISP parameters for acquisition of a subsequent image from the camera 50.

Step 250 has no bearing on the current image and in step 260, the foreground region of the current acquired image is adjusted, again based on the statistics produced at steps 220 and 240, as will be explained in more detail below.

Once this foreground adjustment has been made, the foreground portion of the current acquired image can now be combined with the remaining portion of the selected background image to produce a composite image, step 270, in any one of a number of conventional manners including using suitable blending functions at the interface between the foreground and background regions.

The composite image can now be transmitted to any other participants in the conference session/call as well as possibly being displayed on a local display 300, FIG. 1, in accordance with the user's preference, step 280.

Looking at the steps above in more detail, in step 220, the background image is analyzed. Where the background is a video stream—either live or stored, the analysis of step 220 can be performed either on the first frame of the video, a certain relevant frame or a set of frames (every $n^{th}$ frame). The statistics produced by the analysis comprise a color temperature for the background and, in some cases, the illumination level of the background.

In the embodiment, in order to infer the color temperature of the background, the following steps are performed:

1. Define a set of clusters each corresponding to an illuminant color temperature and having a respective RGB color combination, FIG. 3. Here it will be seen that for lower color temperatures, the R value tends to be much higher than the B value and vice versa for higher temperatures.
2. Cluster each of the pixels of the background image to one of the illuminant clusters, by identifying a minimum distance between the pixel RGB value and the RGB value of each cluster shown in FIG. 3. (For the present example, this assumes that RGB values for pixels have been mapped to a scale of between 0 . . . 255.) Pixels for which the minimum distance to any cluster is larger than a certain threshold can be ignored. This minimum distance can be chosen as a difference in RGB values equivalent to say 1000K.
3. A weighted average of pixels for each cluster is then taken, so that the color temperature for the cluster with the greatest number of closest pixels is chosen as the color temperature, $T_{bkg}$ for the background image. As such, it will be appreciated that the weight for each pixel is inversely proportional with the distance to a given cluster. In any case, it will be appreciated that other measures can be made including a simple aggregate of pixels per cluster to choose the dominant color temperature, $T_{bkg}$ for the background.

To obtain an indication of the brightness level of the background image, in some cases, the mean value of a luminance channel of the background image can be computed. This assumes that during ISP processing, raw RGB data is transformed into a luminance, chrominance format such as YUV, YCC or LAB, but equally luminance can be calculated directly from RGB values.

Both the dominant illuminant color temperature, $T_{bkg}$ and, in some cases, the average luminance value form the background statistics produced by step 220.

In step 240, the foreground region of an acquired image and including a face region is analyzed. In order to obtain a foreground illuminant color temperature, the following steps are performed:

1. Define a set of clusters each corresponding to an illuminant color temperature and having a respective skin color RGB combination, FIG. 4. It will be noted from FIG. 4, that the RGB color combinations for any given temperature differ from those of the same temperature in FIG. 3, as these relate specifically to the appearance of skin tones under different forms of illumination.
2. In the embodiment, where a face region has been identified within the foreground region, each pixel of the face region is clustered to one of the clusters defined at FIG. 4 as before i.e., the remaining pixels of the foreground region are not taken into account in determining a color temperature for the foreground region.
3. Again, a color temperature for the face and so foreground region $T_{initial}$, can be chosen based on a weighted average or any other suitable measure of the pixels associated with each cluster.

In the embodiment, a simple measure of the illumination level of the foreground or face region determines whether the foreground region is overexposed or not. So, in the embodiment, in order to detect if a face region of an image acquired at step 205 is overexposed, the number of pixels of the face region with a luminance higher than 130, on a scale of 0 . . . 255, is counted—these are considered highlight pixels. The number of pixels with a luminance value between 80 and 180 is also counted—these pixels are considered to be (probably) normally illuminated pixels. It will be noted that, in this example, the ranges do overlap and it will be appreciated that in other implementations different ranges can be employed. In any case, if a ratio of highlight pixels to normally illuminated pixels is higher than 1, the face region is considered to be overexposed. In this case, in step 250, a command may be sent to the camera 50 to reduce the exposure level by a minimum amount when acquiring the next image.

Separately, in order to detect if a face region of an acquired image is underexposed, the number of pixels of the face region having the luminance value lower than 120 is counted—these pixels are considered to be (potentially) shadow pixels. Again, if the ratio of shadow pixels to normal pixels is higher than 1, the image is considered to be underexposed, and in this case in step 250, a command may be sent to the camera 50 to increase the exposure level by the minimum amount when acquiring the next image.

It will be understood that in some cases, a face region may comprise a large number of highlight and shadow pixels, sufficient to be regarded as both overexposed and underexposed as defined above. In this case, no adjustment of the camera exposure parameters is made at step 250.

It will also be appreciated that rather than using a single simple measure of luminance for the foreground or face region, more complicated measures can be employed, for example based on binning brightness values for the foreground region into a histogram comprising say 5 bins and comparing the histogram with an equivalent histogram belonging to a correctly exposed face. If the calculated histogram indicates an overexposed face, a command may be sent to the camera 50 to decrease the exposure level by the minimum amount when acquiring the next image and vice versa for an underexposed face.

It is also possible in step 250 to take into account any difference in illumination between the foreground region and the selected background image when determining if any potential further adjustment of exposure values for acquiring a subsequent image is required. In one example, this is implemented by computing a difference between the average luminance of the background image, when provided in step 220, and an average luminance of the face region within the image acquired at step 205. If the difference is larger than a certain threshold, say 80, the exposure level for acquiring a subsequent image can be adjusted. Thus, if the background is very dark or very bright, step 250 will adjust the face exposure against that direction to make the face region of a subsequently acquired image either brighter or darker respectively.

As well as adjusting the exposure levels of a subsequently acquired image in step 250, it is possible to make luminance corrections to the face region in step 260, for example, based on the measures of luminance outlined above. For example, when a subject of a video conference is not well illuminated due to a poorly positioned light source or for example, strong sunlight from one side of a subject, it can be that some portions of their face may be over exposed while others may be underexposed. In cases such as this, luminance levels across the face region can be re-balanced at step 260, to provide a more evenly lit subject. In some cases, it is possible to introduce a lighting effect on the face of the subject by selectively highlighting some portions of the face region to simulate illumination from a given direction and perhaps give the illumination of the face a more natural appearance. In some cases, the introduction of this lighting effect can be made dependent on an estimated lighting direction for the background image, again so that the subject is more realistically harmonized with the background.

As described above, following the two analysis steps 220, 240, the conferencing application will be aware of the background color temperature ($T_{bkg}$) as well as of the face color temperature ($T_{initial}$) within the image acquired at step 205.

For the current frame, any distance between the two temperatures $abs(T_{bkg}-T_{initial})$ is compensated in step 260 by modifying the color temperature $T_{initial}$ of the face region in the direction of $T_{bkg}$. However, in order to allow for appropriate compensation of subsequently acquired images, if the difference is greater than a certain threshold, for example 4000K, then in step 250, the processing of the subsequently acquired image by the ISP 40 is adjusted.

This is important because, in general, an ISP attempts to obtain color balancing of an entire image and, in particular, where a background is warm and a foreground is red, color temperature compensation of the entire image may cause inappropriate over amplification of blue components within the foreground region and this is turn may cause over compression and loss of contrast of those pixels before further adjustment of the face region which has been processed by the ISP 40 is performed at step 260.

So, for example, if an acquired image has a red background and a blue foreground, then color compensation of the entire image may cause the foreground to have a temperature $T_{initial}$ of say 8000k, including needing to have compressed the blue contrast of face pixels. Now if a background with $T_{bkg}$=2000K is chosen at step 210 for a current image, a difference of $T_{initial}$–$T_{bkg}$=8000K–2000K=6000K would need to be corrected.

In the present embodiment, this difference exceeds the threshold of 4000K by 2000K. Now knowing from acquired image meta-data that the ISP measured the color temperature of the scene as a whole when processing the acquired image to be say 3500K and in doing so made the face too blue ($T_{initial}$=8000K) when color correcting the acquired data for the purposes of the present application, the color temperature of the face region in the next acquired image can be made 2000K less blue by overwriting the automatic detection of the ISP and instructing the ISP to correct the image on the basis of an illuminant with a temperature of 3500K+2000K=5500K. As such, at step 250, $T_{isp}$ is set to 5500 K, the value from where the ISP 40 corrects the next acquired image trying to obtain a 6500K image, and assuming lighting conditions have not changed dramatically, the value of the face region in the next acquired image should be close to 6000K, so requiring less compensation in the next iteration of step 260 to match the color temperature of the foreground and the face region in particular with the background.

In the opposite case, an image acquired at step 205 may have a very red foreground region, at say 3000K and a blue background at say 8000K. As the background of the acquired image will tend to occupy the greater portion of the image, default color correction by the ISP 40 will tend to assume the overall temperature of the image is say 7000K and so make the image less blue to make its overall temperature approximately 6500K. This in turn will tend to make the foreground which is to be used in the composite image even more red by reducing its temperature further. Using the present embodiment, if having measured the temperature of the face region within an image acquired from the ISP 40 (and this may still have been corrected to some extent) as say approximately 2500K, step 250 will determine if this temperature is within 4000K of the $T_{BKG}$ measured in step 220. If not, for example, $T_{BKG}$=8000K, then again, the color temperature of the face region in the next acquired image can be made 1500K more blue by overwriting the automatic detection of the ISP and instructing the ISP to correct the image on the basis of an illuminant with a temperature of 7000K−1500K=5500K.

As such, it will be seen that the adjustment of the ISP processing parameters, when required, brings the temperature of the face region of the image acquired at step 205 closer to the temperature $T_{BKG}$ of the background image to ensure that these can then be color harmonized without a loss of contrast.

Nonetheless, for any given frame, it is expected that there may be a color temperature difference of up to around 4000K between the color temperature $T_{initial}$ for the foreground region of the acquired image and the background image temperature $T_{BKG}$.

In step 260, a transformation is generated to change the color temperature $T_{initial}$ of the foreground region pixels of the image acquired at step 205 towards a target temperature $T_{target}$, equivalent to $T_{BKG}$ inferred for the background image.

Figure 3:
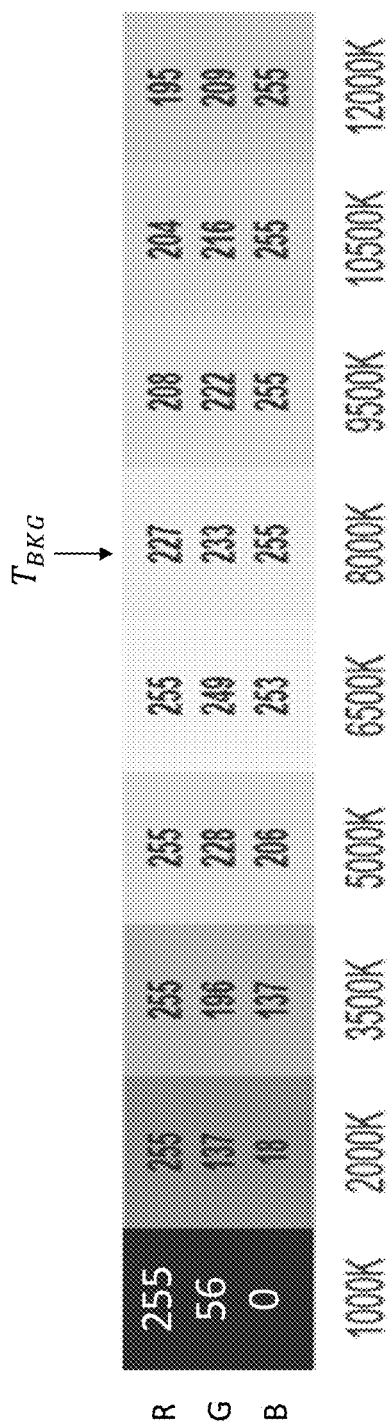
FIG. 3 is an exemplary set of RGB triplets corresponding to color temperatures for a background image.
Figure 4:
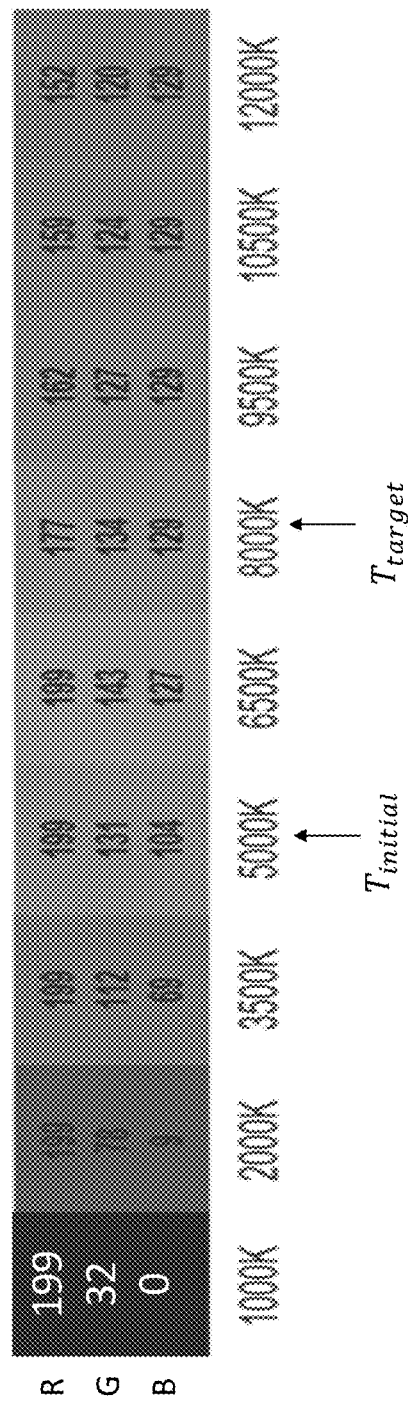
FIG. 4 is an exemplary set of RGB triplets corresponding to color temperatures for a face region of an acquire image.

In the example of FIGS. 3 and 4, $T_{initial}$ is 5000K with a triplet (199,131,104). $T_{BKG}$ has been found to be 8000K with a triplet (227,233,255). This is mapped to a foreground triplet $T_{target}$ of the same temperature (177,134,129).

The next step is to determine a transformation based on the difference between the $T_{initial}$ color triplet (199,131,104) and the triplet (177,134,129) for $T_{target}$. In the embodiment, this transformation does not attenuate the component values of any pixels within the foreground region, as this can generate un-natural results. So, where the blueness of the foreground region needs to be increased, as in the illustrated example, $T_{target}$ is first normalized based on the Red channel to produce $T_{target}'$ so that the smallest amplification for each channel is at least 1.

On the other hand, where $T_{initial}$ is bluer than $T_{target}$, then normalization needs to be based on whichever of the Green or Blue components of $T_{target}$ are proportionally greater than the corresponding components of $T_{initial}$. In this case, the amplification for the Red and the other of the Green or Blue channels would be greater than 1.

In the embodiment, $T_{target}$ and $T_{initial}$ are used to generate normalization components $\alpha_R$, $\alpha_G$, $\alpha_B$ for each channel:

$$\alpha_R = \frac{T_{targetR}}{T_{initialR}} = \frac{177}{199} = 0.89,$$

$$\alpha_G = \frac{134}{131} = 1.02,$$

$$\alpha_B = \frac{129}{104} = 1.24$$

and a normalized $T_{target}'$ is computed, as follows:

$$T_{target}' = \frac{T_{target}}{\min(\alpha_R, \alpha_G, \alpha_B)} = \left(\frac{177}{0.89}, \frac{134}{0.89}, \frac{129}{0.89}\right) = (199, 150, 145).$$

This normalized $T'_{target}$ is considered the target temperature for the foreground region, so ensuring that for each channel an amplification factor for transforming $T_{initial}$ to $T_{target}'$ is greater than 1.

In one embodiment, a gamma transformation:

$$OUT = \left(\frac{IN}{255}\right)^{gamma} * 255$$

is used to bring $T_{initial}$ to $T_{target}'$. The gamma factors are computed independently for each one of the R, G, B channels. In the embodiment, each gamma factor is computed so that:

$$\frac{T'_{targetR}}{255} = \left(\frac{T_{initialR}}{255}\right)^{gamma_R} \rightarrow gamma_R = \frac{\log\left(\frac{T'_{targetR}}{255}\right)}{\log\left(\frac{T_{initialR}}{255}\right)}.$$

Thus:

$$gamma_R = \frac{\log\left(\frac{199}{255}\right)}{\log\left(\frac{199}{255}\right)} = 1$$

$$gamma_G = \frac{\log\left(\frac{150}{255}\right)}{\log\left(\frac{131}{255}\right)} = 0.797$$

$$\text{gamma}_B = \frac{\log\left(\frac{145}{255}\right)}{\log\left(\frac{104}{255}\right)} = 0.629$$

As will be seen in the example of FIGS. 3 and 4, where the temperature of the background is bluer than the temperature of the foreground, the transformation for Red pixels has an amplification factor of 1, whereas for each of Green and Blue this is greater than 1 (even though the gamma factors are less than 1).

Figure 5:
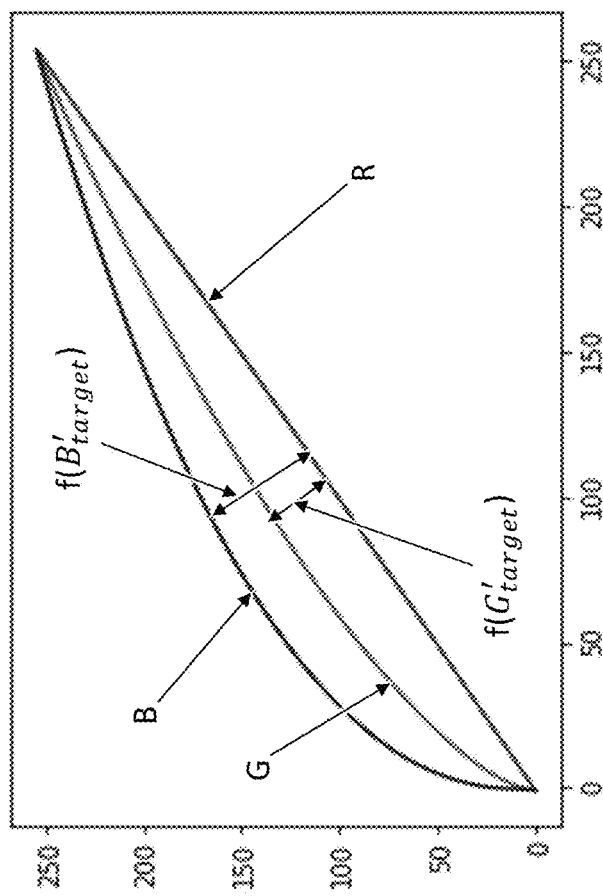
FIG. 5 shows exemplary gamma curves for transforming pixels of a foreground region of an acquired image so that their color temperature more closely matches that of a background image in accordance with an embodiment of the present invention.

In any case, the three independent gamma-like curves transform each foreground region pixel so that its color temperature more closely matches that of the background. Note that in the illustrated example of FIG. 5, using such gamma functions, the amplification factor determines the extent to which mid-value Green and Blue pixels are amplified without saturating pixels with high Green or Blue values, whereas Red values for pixels are not affected.

In the described embodiment, the step 220 of analyzing a given background image is performed only once per image and independently of the acquired image. In variants of the embodiment, the step can be performed after step 240 for every acquired image, so that for example, pixels of the background image corresponding to foreground pixels of the acquired image can be ignored in determining the statistics for the background image, as these pixels of the background will not in any case form a part of the composite image.

The invention claimed is:

1. A method for generating a composite image comprising:
   a) selecting an image as a background for the composite image, wherein the background image comprises a static image or a video stream;
   b) detecting a color temperature of at least a portion of said background image, said color temperature for said background image corresponding to a triplet of red, green and blue values for an illuminant of said color temperature for said background image, wherein when said background image is the video stream, color temperature and illuminance levels are detected at every Nth frame of the video stream;
   c) acquiring from a camera through an image signal processor (ISP) performing white balance correction of acquired image data, an image including a foreground region including face of a user;
   d) detecting a color temperature and an illuminance level of at least a portion of said foreground region, said color temperature for said foreground region corresponding to a triplet of red, green and blue values for skin under an illuminant of said color temperature for said foreground region;
   e) responsive to said color temperature and illuminance level for said foreground region differing from said color temperature and illuminance level for said background image by more than a threshold amount, setting a color temperature for said white balance correction of a subsequently acquired image which causes skin pixels within said foreground region of said subsequently acquired image to have a color temperature closer to said color temperature for said background image, and adjusting an exposure setting of said camera for said subsequently acquired image to adjust said illuminance level for said foreground region;
   f) combining pixel values of said foreground region with pixel values of said background image corresponding to a background region of said acquired image to provide said composite image; and
   g) repeating steps c) to f) at least once.

2. A method according to claim 1 further comprising:
responsive to said color temperature for said foreground region differing from said color temperature for said background image:
identifying a triplet for a foreground region temperature corresponding to a temperature of said background image; and
mapping values of said triplet for said foreground region to said identified triplet to determine an amplification factor for at least one of said red, green or blue channels of said acquired image; and
amplifying pixel values of said foreground region according to said one or more amplification factors; and
wherein said combining comprises:
combining amplified pixel values of said foreground region with pixel values of said background image corresponding to a background region of said acquired image to provide said composite image.

3. The method of claim 2 wherein when said color temperature of said background image is greater than said color temperature for said foreground region, said amplification factor for each of said blue and green channels of said foreground region is greater than land said amplification factor for said red channel of said foreground region is 1.

4. The method of claim 3 comprising determining a gamma function for amplifying values of said blue and green channels without saturating said amplifying values of said blue and green channels.

5. The method of claim 1 wherein said color temperature for said foreground region is one of a plurality of discrete foreground temperatures and wherein said step of detecting a color temperature of at least a portion of said foreground region comprises determining the one of the plurality of discrete foreground temperatures whose triplet is closest in value to a maximum number of pixels in at least a face region of said foreground region.

6. The method of claim 5 wherein said color temperature for said background image is one of a plurality of discrete background temperatures and wherein said step of detecting a color temperature of at least a portion of said background image comprises determining the one of the plurality of discrete background temperatures whose triplet is closest in value to a maximum number of pixels in said at least a portion of said background image.

7. The method of claim 6 wherein at least come of said triplets of values for temperatures of said foreground region do not correspond to said triplets of values for the same temperatures of said background image.

8. The method of claim 1 performed by a conferencing system client application during a conference call and further comprising the step of transmitting said composite image to client applications of other users of said conference call.

9. The method of claim 1 further comprising detecting a face region within said foreground region.

10. The method of claim 9 further comprising determining whether said face region is over exposed or under exposed and responsive to said face region being over exposed or under exposed by more than a threshold amount, adjusting an exposure setting of said camera for said. subsequently acquired image to reduce the extent of said over or under exposure.

11. The method of claim 10 comprising determining whether said face region is over exposed or under exposed in accordance with whether an illumination value of said face region differs from an illumination value of said background image by more than a threshold amount.

12. The method of claim 11 wherein said illumination value is an average illumination value.

13. The method of claim 1 further comprising repeating steps a) and b) for successive images chosen as background images.

14. The method of claim 13 wherein said successive images are images from either: a stored video sequence; or a live stream acquired from a source other than said camera.

15. The method of claim 1 wherein steps a) and b) are performed after detecting said foreground region within said acquired image and wherein said at least a portion of said background image comprises a portion of said background image corresponding to a background region of said acquired image.

16. The method of claim 1 further comprising: obtaining a color temperature for said acquired image determined by said ISP; and said setting a color temperature for said white balance correction comprises adjusting said color temperature for said acquired image according to the extent to which said color temperature for said foreground region differs from said color temperature for said background image.

17. A conferencing system comprising memory and one or more processors configured to connect to a video camera; and perform the steps of claim 1.

18. A computer program product comprising a non-transitory computer readable medium on which processor instructions are stored which when executed on a computing device causes the processor to perform a process of operably connecting to a video camera and performing the steps of claim 1.

* * * * *